United States Patent [19]

Hurlburt et al.

[11] Patent Number: 4,958,593
[45] Date of Patent: Sep. 25, 1990

[54] VIVARIUM

[76] Inventors: James P. Hurlburt, 8874 Cypress Ave.; Michael R. Lagasse, 17333 Valley Blvd., both of Fontana, Calif. 92335

[21] Appl. No.: 209,333

[22] Filed: Jun. 20, 1988

[51] Int. Cl.$^5$ .............................................. A01K 63/00
[52] U.S. Cl. ............................................................... 119/5
[58] Field of Search ............................ 119/5, 3; 47/69

[56] References Cited

U.S. PATENT DOCUMENTS

| | | | |
|---|---|---|---|
| 164,074 | 6/1875 | Chase | 119/5 |
| 165,639 | 7/1875 | Wenmacker | 119/3 X |
| D. 254,874 | 4/1980 | Totten | D30/11 |
| 296,853 | 4/1884 | Ledig | 119/5 |
| 1,838,215 | 12/1931 | Clairmont | 119/5 |
| 3,283,743 | 11/1966 | Dibelius | 119/5 |
| 3,316,882 | 5/1967 | Renwick | 119/5 |
| 3,921,583 | 11/1975 | DeShores | 119/5 |
| 3,992,881 | 11/1976 | Yellin | 47/69 |
| 4,117,805 | 10/1978 | Ward | 119/5 |
| 4,147,131 | 4/1979 | Walker | 119/5 |
| 4,204,499 | 5/1980 | Leyva et al. | 119/5 |

Primary Examiner—Robert P. Swiatek
Assistant Examiner—T. Manahan
Attorney, Agent, or Firm—Denton L. Anderson

[57] ABSTRACT

A vivarium comprising at least one terrarium completely submerged in the water in an aquarium. The terrarium and the aquarium shares a common bottom, but are not in fluid communication. The terrarium is accessible through an access opening on the bottom of the terrarium. There can be transparent passageways linking various portions of the terrarium and extending through the aquarium, for travel by animals kept in the terrarium. There can also be transparent passageways linking various portions of the aquarium and extending through the terrarium, for travel by the marine organisms kept in the aquarium.

9 Claims, 2 Drawing Sheets

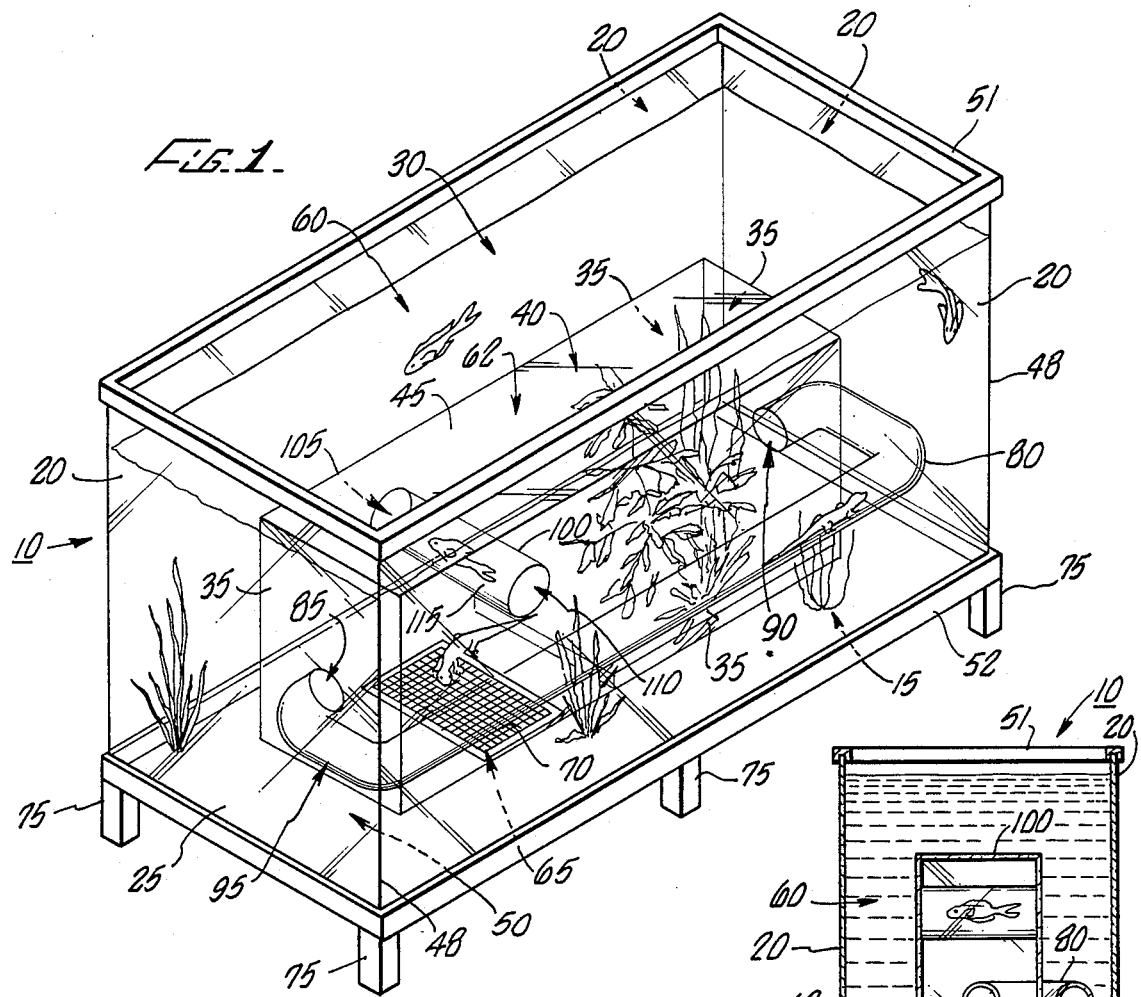
Fig. 1.
Fig. 3.
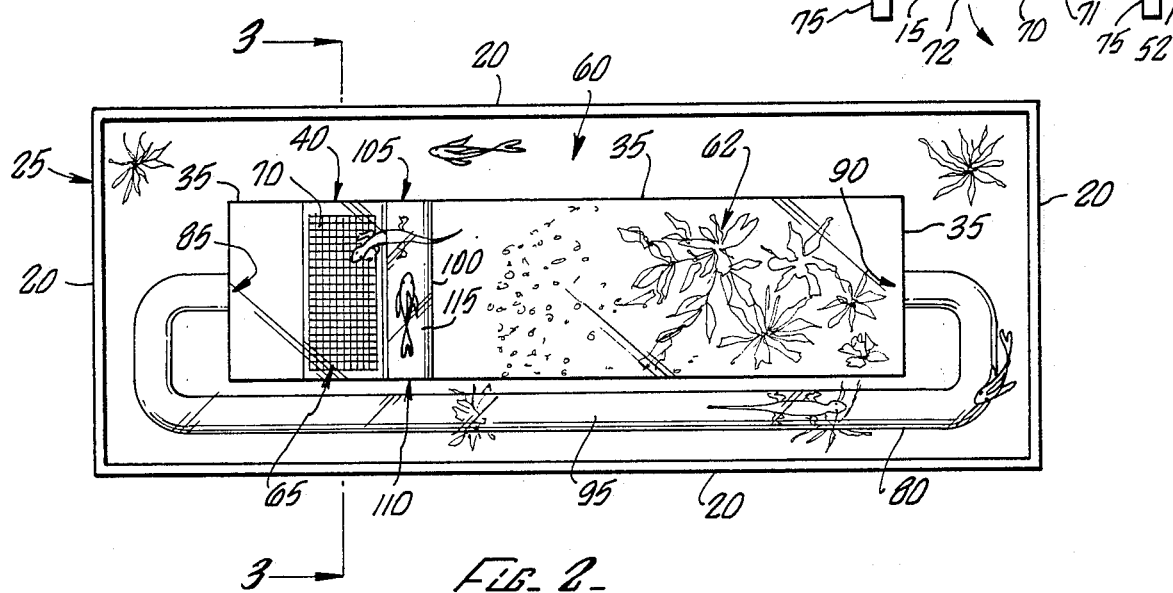
Fig. 2.

VIVARIUM

BACKGROUND

This invention relates to a vivarium, more specifically to a combination terrarium - aquarium Aquariums have been known for centuries. They allow marine plants and animals to be kept and viewed in a controlled environment. Likewise, terrariums have long allowed convenient viewing of terrestrial plants and animals of exotic origin. Aquariums and terrariums can be both educational and entertaining.

Most terrestrial plants and animals cannot live under water. For that reason it is visually stimulating and interesting to see terrestrial plants and animals displayed next to aquatic life forms, especially if the terrestrial life forms exhibited appear to be submerged under water, although as a matter of fact, they are not located in the water in which live fish and the like are kept For example, it is visually interesting to see a bird appearing to fare well under water Prior art attempts at such terrarium-aquarium combinations, such as U.S. Pat. No. 296,853 to Ledig, uses a double walled, annular aquarium. Terrestrial life forms are placed in the terrarium area surrounded by the annular aquarium. This can give the illusion of having, for example, a bird living under water. as shown in Ledig. However, typical of such prior art combinations is that the terrarium is open to the atmosphere on the top. This detracts seriously from the desired visual impression that the terrarium is actually submerged under water Other attempts at submerged terrariums, for example, U.S. Pat. No. 4,204,499 to Leyva, which maintains an air space underwater by clamping an inverted container under the water, has the shortcoming that there is no convenient access to the inside of the terrarium. Rearrangement of the terrarium display and the cleaning of the terrarium are both major undertakings in such submerged terrariums.

What is needed is a vivarium, comprising a terrarium which appears to be totally submerged in water in an aquarium, with convenient access provided to the inside of the terrarium.

SUMMARY

This invention satisfies the above needs. A novel vivarium for the sustenance of both terrestrial and aquatic life is provided.

A preferred version of the vivarium of the present invention comprises:

(a) a bottom wall;
(b) upstanding, substantially transparent outer side walls which in cooperation with the bottom wall form an outer container; and
(c) upstanding, substantially transparent inner side walls which in cooperation with the bottom wall form at least one inner container, each inner container also having an enclosing top wall, such that the inner container is not in fluid communication with the outer container.

The top of the outer side walls is higher than the top wall of the inner container. The space between the inner container and the outer container is used as an aquarium, generally to be filled with water to a level above the top of the inner container. A portion of the bottom wall inside at least one of the inner containers has at least one access opening therethrough such that the inside of the inner container is normally in fluid communication with the atmosphere. Each inner container is for use as a terrarium.

Preferably the vivarium further comprises supporting means, e.g. legs, supporting the vivarium and spacing the bottom wall of the vivarium apart from the supporting surface, for easy access into the inside of the terrarium through the access opening. Preferably there is a door which normally closes the access opening in the bottom wall, to prevent the escape of the terrestrial animals kept in the terrarium.

To increase visual interest, the walls of the terrarium can be joined by substantially transparent tubes, such tubes being in fluid communication with either the aquarium or the terrarium. Therefore a live fish kept in the aquarium could appear to be swimming through the air in the terrarium, and a land animal kept in the terrarium could appear to be running through the water in the aquarium. There can also be multiple terrariums submerged in the aquarium, at least some of which are linked together by substantially transparent tubes.

DRAWINGS

These and other features, aspects and advantages of the present invention will become better understood with reference to the following description, appended claims, and accompanying drawings where FIG. 1 is an oblique elevational perspective view of a preferred embodiment of the vivarium of the subject invention;

FIG. 2 is a top plan view of the vivarium of FIG. 1;

FIG. 3 is a cross-sectional view at line 3-3 of the vivarium of FIG. 2;

DESCRIPTION

Figure 4:
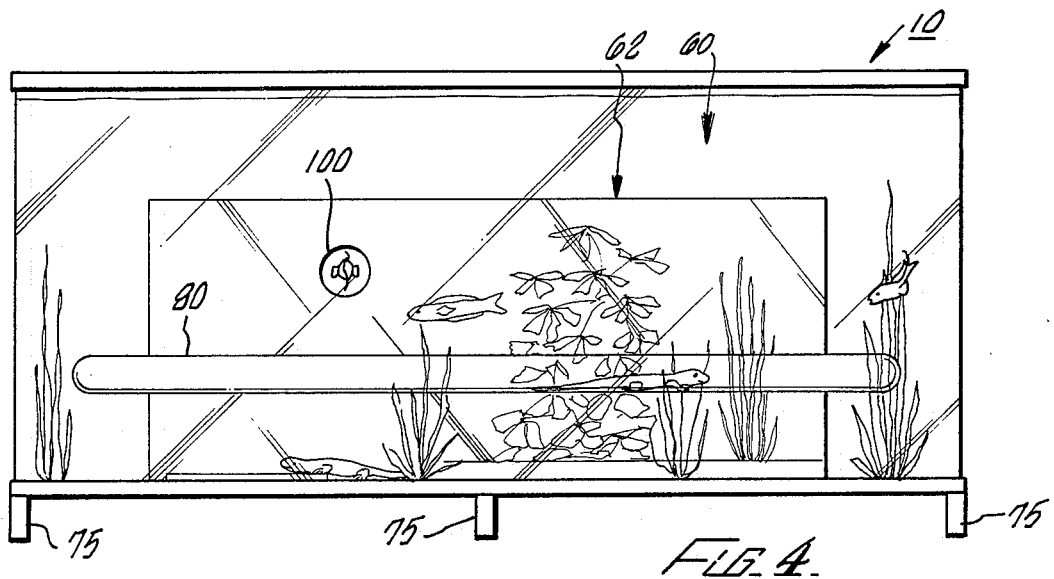
FIG. 4 is a front elevational view of the vivarium of FIG. 1.

The present invention is directed to a vivarium having a terrarium which appears to be totally submerged in an aquarium With reference to the drawings, and particularly FIGS. 1, 2, and 3, a vivarium 10 has a bottom wall 15. Upstanding, substantially transparent outer side walls 20 cooperate with the bottom wall 15 to form a tank or outer container 25. The top of the outer container 25 can be open, as shown in FIG. 1, or it can be equipped with a removable cover as is conventional in the aquarium art.

Upstanding, substantially transparent inner side walls 35 cooperate with the bottom wall 15 to form an inner container 40. The inner container 40 is sealed at the top by a top wall 45, a space 50 being formed between the inside of the outer container 25 and the outside of the inner container 40. The inner container 40 and the outer container 25 are not in fluid communication.

The walls 15, 20, 35 and 45 can be constructed of glass, or other suitable transparent material such as plastics, and can be joined together by conventional means such as by the use of a water resistant adhesive suitable for aquarium use, the adhesive forming a seam 48. The walls could be substantially planar, as shown in FIG. 1, with the seam 48 joining edges of the walls. The top and bottom of the outer side walls can be capped with upper fringe 51 and lower fringe 52 respectively.

These fringes can have an angle or channel shaped cross-section, and can serve both decorative and structural purposes, as its well known in the aquarium art. However, their presence is not absolutely necessary.

Figure 6:
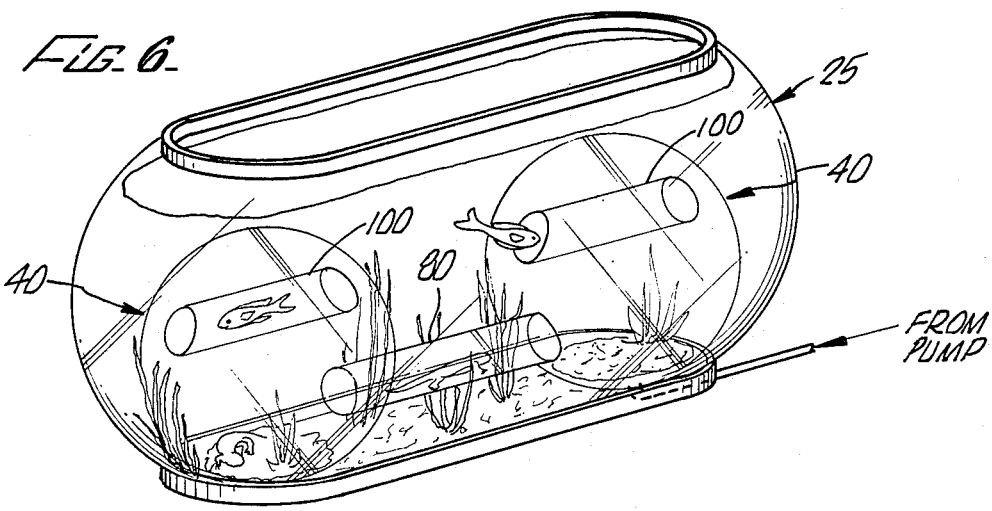
FIG. 6 is a perspective view of yet another preferred embodiment of the vivarium of the subject invention.

Alternatively, the walls could also be curved, as shown in FIG. 6, with the inner and outer containers 25 and 40 being substantially seamless, as being formed of substantially continuous walls. For example, the outer container 25 can be formed to have a bowl shape, as shown in FIG. 6. Each inner container 40 can be formed in the shape of a globe, or of an inverted bowl. Although it is necessary that the side walls 20 and 35 be upstanding, they need not be either substantially planar or vertical, as is depicted in FIG. 1. Accordingly, these walls can have any desired shape and orientation, as is well known in the aquarium art.

The outer container 25 and thus the space 50 between the inside of the outer container 25 and the outside of the inner container 40, is used as an aquarium 60. The aquarium 60 is generally filled with water to a level sufficient to totally submerge the inner container 40. The aquarium 60 and thus the water-filled space 50 can be populated with various aquatic life forms, such as aquatic plants, live fish and other marine animals, and other conventional aquarium exhibits, such as rocks and coral and ceramic figures, etc. Amphibian life forms, e.g. frogs, etc , can also be kept in the aquarium 60.

The bottom wall 15, in an area located inside the inner container 40, has an access opening 65, such that the inside of inner container 40 can conveniently be accessed from the bottom of the vivarium 10. A removable door means 70 normally closes the access opening 65. In the exemplary configuration show in FIG. 3, the door means 70 is a hinged grated door which is normally held in the closed position, for preventing ingress and egress to the inside of the inner container 40. The door is hinged at hinges 71, and normally latched shut by latch 72. The door 70 swings downwards to open, as shown in FIG. 3. Alternatively, the door 70 can also be hinged so that it swivels sideways to open. The access opening 65 can be co-extensive with the entire bottom of the inner container 40, or it can be smaller The inside of the inner container is used as a terrarium 62. It could be filled with exhibits of terrestrial origin, such as miniature landscapes, air breathing plants such as bonsai and other exotic plant species, and air breathing animals or pets such as lizards, newts, white mice, hamsters, snakes, birds, and insects such as ants and spiders, etc.

Through the access opening 65, the exhibit within the terrarium 62 can conveniently be rearranged as often a desired The pets can also be fed and the terrarium 62 cleaned through the access opening 65. The vivarium 10 need not be dismantled and the aquarium 60 need not be drained for performing the day to day chores of maintaining the terrarium. To further facilitate access through the opening 65, preferably the vivarium 10 has support means 75, e.g. legs, for supporting the vivarium, and for spacing the bottom of the vivarium 10 apart from a supporting surface (e.g. the top of a table supporting the vivarium), so that it would be easy to work with arms and hands beneath the bottom of the vivarium 10, and through the access opening 65.

In use, the vivarium 10 allows terrestrial life forms to be displayed as if they are living under and in water, right next to aquatic plants and live fish.

The door means 70 need not be airtight. In fact it is preferable that it is not, such that the inside of the terrarium 62 is in fluid communication with the outside atmosphere, such that the air breathing life forms inside the terrarium 62 would be supplied with the air needed. For example, the door means 70 could comprise a grated door, as shown in FIG. 1, which allows air to flow in and out of the inner container 40. Alternatively, especially where a controlled atmosphere within the terrarium is desired, a powered air-supply could be provided. For example, the air pump for the aquarium 60 could also be used to blow fresh air into the terrarium 62 through an air tube 77, which extends through the bottom of the inner container 40, as shown in FIG. 6

To enhance visual interest, passageways linking various parts of the terrarium 62 and extending through the water in the aquarium 60 can be provided. The air breathing pets can travel through such passageways, and would appear to be travelling through water. Similar passageways can also be provided for linking the various parts of the aquarium 60, such passageways extending through the air space in the terrarium 62. Fish swimming through such passageways would appear to be swimming through the air in the terrarium.

Referring to FIGS. 1 and 2, the vivarium can have tube means, namely a dry tube 80, having substantially transparent walls. The dry tube 80 connects an opening 85 at one portion of the inner side walls 35, to another opening 90 at another portion of the inner side walls 35. The dry tube 80 extends through the water in the aquarium 60. The inside of the dry tube 80 forms a passageway 95, which is in fluid communication with the terrarium 62. Thus, the passage way 95 is air-filled, and air breathing pets can travel through the passageway 95.

Similarly, again referring to FIGS. 1 and 2, there can be tube means, namely a wet tube 100, having substantially transparent walls. The wet tube 100 connects an opening 105 at one portion of the inner side walls 35, to another opening 110 at another portion of the inner side walls 35. The wet tube 100 extends through the air space inside the terrarium 62 (the inner container 40). The inside of the wet tube 100 forms a passageway 115, which is in liquid communication with the aquarium 60. That is, the passageway 115 is water-filled, and marine animals such as live fish can swim through the passageway 115.

The tube means 80 and 100 can be constructed of conventional transparent materials, such as glass or plastics, and can be joined to the inner side walls by conventional means, such as by the use of water resistant adhesives suitable for aquarium construction. The tubes can be substantially straight and uniform in diameter, as shown in the drawings herein, but they are not so limited. The tubes can also be of any shape, size, cross-section, configuration and contortion, limited only by creativity, and by suitability for use with the particular pets involved. Also, a tube can branch into two or more tube branches.

Figure 5:
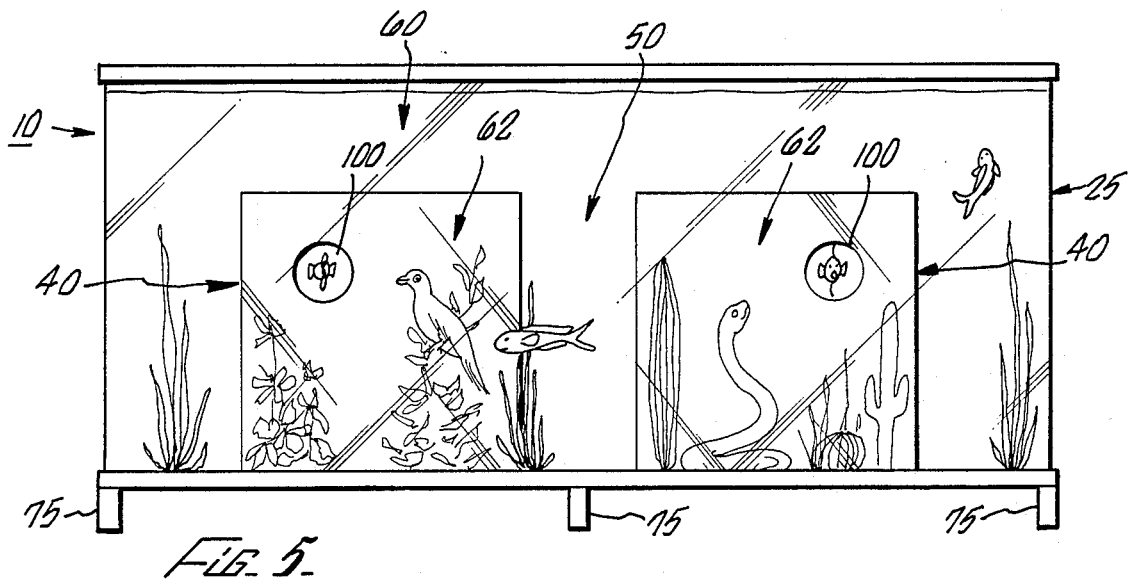
FIG. 5 is a front elevational view of another preferred embodiment of the vivarium of the subject invention.

As shown in FIG. 5, the vivarium 10 can have more than one terrarium 62 being submerged in the water of the aquarium 60 Each terrarium 62 is as described before. Incompatible exhibits can thus be displayed side by side as long as these terrariums are not interconnected. For example, birds can be kept in one terrarium, and snakes can be kept in another, and a rare worm collection can be kept in yet another adjacent terrarium, all within the same aquarium 60. The number of terrariums is limited generally by the sizes of the aquarium and the terrariums, and the need for convenient access to each of the terrariums through the bottom of the vivarium 10. Each of the terrariums would have its own access opening. Passageways can be provided through some of all of the terrariums for travel therethrough by the marine animals that are kept in the aquarium 60.

FIG. 6 shows another preferred embodiment of the subject invention. Multiple terrariums, each as described before, are submerged in water of the aquarium 60. The terrariums are connected to each other by dry tubes 80, such that the air-breathing pets have access to all of the terrariums. Again, the background exhibits in each terrarium can be different. Passageways can also be provided through some or all of the terrariums for swimming therethrough by marine animals kept in the aquarium 60.

Although certain preferred embodiments of the present invention have been described, the spirit and scope of the invention is by no means restricted to what is described above. For example, within the general framework of (a) one or more terrariums submerged in an aquarium, (b) access to the terrariums through openings in their bottom walls, (c) air-filled passageways passing through the water in the aquarium, and (d) water-filled passageways passing through the air space in the terrarium, there is a very large number of permutations and combinations possible, all of which are within the scope of the present invention. For example, even though only a maximum of two terrarium chambers are shown in each of the drawings, the number of terrariums could be much larger than two.

What we claim is:

1. A vivarium comprising:
   (a) a bottom wall;
   (b) upstanding, substantially transparent outer side walls which in cooperation with the bottom wall form an outer container;
   (c) upstanding, substantially transparent inner side walls which in cooperation with the bottom wall form a single inner container, the inner container also having an enclosing top wall, such that the inner container is not in fluid communication with the outer container; and
   (d) at least one substantially transparent tube member forming a dry tube, the said at least one dry tube connecting an opening at one portion of the inner side walls to another opening at another portion of the inner side walls, with the said at least one dry tube extending through the space between the inner container and the outer container, the inside of the said at last one dry tube being in fluid communication with the inside of the inner container; wherein the top of the outer side walls extend higher than the top wall of the inner container; the space between the inner container and the outer container is adapted to for use as an aquarium, capable of being filled with water to a level above the top of the inner container; a portion of the bottom wall inside the inner container having at least one access opening therethrough; the inside of the inner container being in fluid communication with the atmosphere; and the inner container being adapted for use as a terrarium.

2. The vivarium of claim 1, further comprising at least one substantially transparent tube member forming a wet tube, the said at least one wet tube connecting an opening at one portion of the inner side walls, the said at least one wet tube extending through the inside of the inner container, the inside of the said at least one wet tube being in fluid communication with the space between the inner container and the outer container.

3. The vivarium of claim 2, comprising a plurality of the wet tubes.

4. The vivarium of claim 1, comprising a plurality of the dry tubes.

5. A vivarium comprising:
   (a) a bottom wall;
   (b) upstanding, substantially transparent outer side walls which in cooperation with the bottom wall form an outer container;
   (c) upstanding, substantially transparent inner side walls which in cooperation with the bottom wall form at least two inner containers spaced apart from each other, each said at least two inner containers also having an enclosing top wall, such that each said at least two inner container is not in fluid communication with the outer container; and
   (d) at least one substantially transparent tube member forming a dry tube, the said at least one dry tube connecting an opening at a portion of the inner side walls of one of the said at least two inner containers to another opening at a portion of the inner side walls of another of the said at least two inner containers, the said at least one dry tube extending through the space between the said at least one inner containers and the outer container, the inside of the said at least one dry tube being in fluid communication with the insides of said at least two inner containers; and
   (e) at least one substantially transparent tube member forming a wet tube, the said at least one wet tube connecting an opening at one portion of the inner side walls of one of the said at least two inner containers to another opening at another portion of the inner side walls of the same inner container, with the said at least one wet tube extending through the same inner container, the inside of the said at least one wet tube being in fluid communication with the space between the said at least two inner containers and the outer container wherein the top of the outer side walls extend higher than the top wall of each of the said at least two inner containers; the space between each of the said at least two inner containers and the outer container is adapted for use as an aquarium, capable of being filled with water to a level above the top of each of the said at least two inner containers; a portion of the bottom wall inside each of the said at least two inner containers having at least one access opening therethrough; the inside of each of the said at least two inner container being in fluid communication with the atmosphere; and each of the said at least two inner container being adapted for use as a terrarium.

6. The vivarium of claim 5, comprising a plurality of the dry tubes

7. The vivarium of claim 6, wherein the inner containers are all in fluid communication with each other through the drY tubes.

8. The vivarium of claim 5, comprising a plurality of the wet tubes, at least one wet tube extending through each of two different inner containers.

9. The vivarium of claim 14, wherein there is at least one wet tube extending through each inner container.

* * * * *